(12) United States Patent
Mori

(10) Patent No.: US 11,204,479 B2
(45) Date of Patent: Dec. 21, 2021

(54) LENS DEVICE, CAMERA, LENS DRIVE CONTROL METHOD, AND LENS DRIVE CONTROL PROGRAM

(71) Applicant: FUJIFILM Corporation, Tokyo (JP)

(72) Inventor: Koji Mori, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 385 days.

(21) Appl. No.: 16/459,139

(22) Filed: Jul. 1, 2019

(65) Prior Publication Data

US 2019/0324226 A1 Oct. 24, 2019

Related U.S. Application Data

(63) Continuation of application No. PCT/JP2018/001928, filed on Jan. 23, 2018.

(30) Foreign Application Priority Data

Feb. 21, 2017 (JP) .............................. JP2017-030255

(51) Int. Cl.
*G02B 7/04* (2021.01)
*G02B 7/02* (2021.01)
*G03B 17/14* (2021.01)

(52) U.S. Cl.
CPC ............... *G02B 7/04* (2013.01); *G02B 7/021* (2013.01); *G03B 17/14* (2013.01)

(58) Field of Classification Search
CPC ........ G02B 7/005; G02B 7/021; G02B 7/023; G02B 7/04; G02B 7/08; G02B 7/09;
(Continued)

(56) References Cited

U.S. PATENT DOCUMENTS

| 5,202,717 A | 4/1993 | Ookubo et al. |
| 2009/0244730 A1 | 10/2009 | Aoki et al. |

FOREIGN PATENT DOCUMENTS

| JP | 4-63308 A | 2/1992 |
| JP | 5-5822 A | 1/1993 |

(Continued)

OTHER PUBLICATIONS

International Preliminary Report on Patentability and Written Opinion of the International Searching Authority(Forms PCT/IB/326, PCT/IB/373 and PCT/ISA/237), dated Sep. 6, 2019, for International Application No. PCT/JP2018/001928, with an English Translation.

(Continued)

*Primary Examiner* — Joseph P Martinez
(74) *Attorney, Agent, or Firm* — Birch, Stewart, Kolasch & Birch, LLP

(57) ABSTRACT

First and second focusing lenses G2 and G3 are moved to perform focusing. The second focusing lens G3 is moved to a position, which is derived by a function f(x), relative to the position x of the first focusing lens G2. The movement of the first and second focusing lenses G2 and G3 is controlled on the basis of origins that are individually set. The origin of the first focusing lens G2 is detected by a first photo interrupter 24, and the origin of the second focusing lens G3 is detected by a second photo interrupter 34. In a case where the first and second photo interrupters 24 and 34 have mounting errors, the function f(x) is corrected on the basis of the mounting errors and the movement of the second focusing lens G3 is controlled on the basis of the corrected function F(x).

19 Claims, 6 Drawing Sheets

(58) Field of Classification Search
CPC ........... G02B 7/10; G02B 7/102; G02B 9/34; G02B 13/004; G02B 15/14; G02B 15/144; G02B 15/15
See application file for complete search history.

(56) References Cited

FOREIGN PATENT DOCUMENTS

| | | | | |
|---|---|---|---|---|
| JP | H055822 | * | 1/1993 | ............... G02B 7/08 |
| JP | 2005-234101 A | | 9/2005 | |
| JP | 2009-237265 A | | 10/2009 | |
| JP | 2013-37018 A | | 2/2013 | |

OTHER PUBLICATIONS

International Search Report (Form PCT/ISA/210), dated Apr. 24, 2018, for International Application No. PCT/JP2018/001928, with an English translation.

* cited by examiner

LENS DEVICE, CAMERA, LENS DRIVE CONTROL METHOD, AND LENS DRIVE CONTROL PROGRAM

CROSS-REFERENCE TO RELATED APPLICATIONS

This application is a Continuation of PCT International Application No. PCT/JP2018/001928 filed on Jan. 23, 2018, which claims priority under 35 U.S.C § 119(a) to Japanese Patent Application No. 2017-030255 filed on Feb. 21, 2017. Each of the above application(s) is hereby expressly incorporated by reference, in its entirety, into the present application.

BACKGROUND OF THE INVENTION

1. Field of the Invention

The present invention relates to a lens device, a camera, a lens drive control method, and a lens drive control program, and more particularly, to a lens device, a camera, a lens drive control method, and a lens drive control program in which an interval between some lenses forming an optical system is regularly changed.

2. Description of the Related Art

A floating mechanism is known as a technique that corrects a change in aberration occurring during focusing. The floating mechanism corrects a change in aberration, which occurs during focusing, by changing an interval between some lenses forming an optical system according to a change in imaging distance. The floating mechanism is also called a close-distance aberration correction mechanism, and can satisfactorily correct aberration that is caused by close-distance imaging.

Generally, the respective lenses are independently driven in the floating mechanism. In a case where the respective lenses are to be independently driven, the movement of the respective lenses is controlled on the basis of individually set origins. For example, the number of steps of a stepping motor is controlled on the basis of the origin, so that the movement of each lens is controlled.

The detection of the origin of the lens is performed using an origin detection sensor, such as a photo interrupter. For example, an origin detection sensor is installed at a predetermined position in a lens barrel, and detects that the lens is positioned at the origin in a case where the sensor detects the lens. There is a problem that the position of the lens cannot be correctly controlled in a case where the origin detection sensor is not correctly mounted at a predetermined installation position determined by design.

JP2005-234101A proposes a method, which includes measuring a mounting error of a sensor in advance and adding or subtracting the error to or from the amount of control as the amount of offset, as a method of solving this problem.

Further, JP2009-237265A proposes a technique that measures an interval between a sensor detecting the origin of a first lens and a sensor detecting the origin of a second lens, obtains a difference between the measured interval and an interval determined by design, and corrects the position of the second lens with the obtained difference to correctly ensure an interval between the first and second lenses.

SUMMARY OF THE INVENTION

However, since the method proposed in JP2005-234101A is a method of individually correcting and controlling the respective lenses, there is a drawback that the control of lenses is complicated in a case where there are a plurality of lenses to be controlled.

On the other hand, since the method proposed in JP2009-237265A is a method of measuring an interval between the two sensors and correcting the position of the lens, there is a drawback that the position of the lens is corrected without the consideration of the position of the origin determined by design. Further, since the method proposed in JP2009-237265A measures an interval between the two sensors by the movement of the lens, there is also a drawback that an applicable lens is limited. That is, since at least one lens should be adapted to be movable to the position of the sensor for the other lens in the method proposed in JP2009-237265A, there is also a drawback that an applicable lens is limited. Furthermore, since the movement stroke of the lens should be ensured in a case where at least one lens is adapted to be movable to the position of the sensor for the other lens, there is also a drawback that a lens is increased in size.

The invention has been made in consideration of the above-mentioned circumstances, and an object of the invention is to provide a lens device, a camera, a lens drive control method, and a lens drive control program that can correctly drive a plurality of interlocking lenses.

Means for solving the above-mentioned problems are as follows.

(1) A lens device comprising:
a main lens;
a main lens drive unit that drives the main lens;
a main lens detection unit installed at a main lens detection position and detecting the main lens to detect that the main lens is positioned at a main lens origin;
a main lens controller that controls movement of the main lens on the basis of the main lens origin and moves the main lens to a target position;
a subordinate lens;
a subordinate lens drive unit that drives the subordinate lens;
a subordinate lens detection unit installed at a subordinate lens detection position and detecting the subordinate lens to detect that the subordinate lens is positioned at a subordinate lens origin; and
a subordinate lens controller that controls movement of the subordinate lens on the basis of the subordinate lens origin and moves the subordinate lens to a position, which is derived by a function f(x), relative to a position x of the main lens,
wherein in a case where the main lens detection unit and the subordinate lens detection unit have mounting errors, the subordinate lens controller corrects the function f(x) on the basis of the mounting errors and controls the movement of the subordinate lens on the basis of a corrected function F(x).

According to this aspect, the lens device comprises the main lens and the subordinate lens. The main lens and the subordinate lens interlock with each other, and an interval between the main lens and the subordinate lens is regularly changed. Specifically, in a case where the main lens is moved, the subordinate lens is moved to a position, which is derived by the function f(x), relative to the position x of the main lens and an interval between the main lens and the subordinate lens is regularly changed.

The movement of the main lens is controlled on the basis of the main lens origin. The main lens detection unit detects that the main lens is positioned at the main lens origin. The main lens detection unit is installed at the main lens detection position and detects the main lens to detect that the main lens is positioned at the main lens origin.

The movement of the subordinate lens is also controlled on the basis of the subordinate lens origin. The subordinate lens detection unit detects that the subordinate lens is positioned at the subordinate lens origin. The subordinate lens detection unit is installed at the subordinate lens detection position and detects the subordinate lens to detect that the subordinate lens is positioned at the subordinate lens origin.

In a case where the main lens detection unit is correctly installed at the main lens detection position determined by design, the main lens origin can be correctly set on the basis of the detection result of the main lens detection unit. Then, in a case where the main lens origin can be correctly set, the main lens can be correctly moved to a desired position.

Likewise, in a case where the subordinate lens detection unit is correctly installed at the subordinate lens detection position determined by design, the subordinate lens origin can be correctly set on the basis of the detection result of the subordinate lens detection unit. Then, in a case where the subordinate lens origin can be correctly set, the subordinate lens can be correctly moved to a desired position.

However, since it is difficult to correctly install the main lens detection unit and the subordinate lens detection unit at the main lens detection position and the subordinate lens detection position, mounting errors occur. In a case where the mounting errors occur, it is not possible to correctly move the main lens and the subordinate lens to desired positions.

Accordingly, in this aspect, in a case where the main lens detection unit and the subordinate lens detection unit have mounting errors, the function $f(x)$ is corrected on the basis of the mounting errors and the movement of the subordinate lens is controlled on the basis of the corrected function $F(x)$. The function $f(x)$ is corrected so as to cancel the mounting errors.

Accordingly, even in a case where the main lens detection unit and the subordinate lens detection unit have mounting errors, the main lens and the subordinate lens can be correctly driven. Further, since a command for the lens device is completed by only a command for the main lens, the control of the lens device can also be easily performed. Further, since only the position of the subordinate lens is corrected, the extra movement stroke of the main lens does not need to be considered. Accordingly, the size of the lens device can be reduced in the moving direction of the main lens. Furthermore, since only the position of the subordinate lens is corrected, the number of parameters required for control can also be reduced.

(2) In the lens device of (1), in a case where the subordinate lens is to be moved to a position, which is derived by a function $f(x)=ax+b$, relative to the position x of the main lens, the subordinate lens controller corrects the function $f(x)$ to a function $F(x)=ax+b+(aM-N)$ and controls the movement of the subordinate lens on the basis of the corrected function $F(x)$ (here, M represents an offset value based on the mounting error of the main lens detection unit and N represents an offset value based on the mounting error of the subordinate lens detection unit).

According to this aspect, in a case where the subordinate lens is to be moved to a position, which is derived by a function $f(x)=ax+b$, relative to the position x of the main lens and the main lens detection unit and the subordinate lens detection unit have mounting errors, the function $f(x)$ is corrected to a function $F(x)=ax+b+(aM-N)$.

Here, a and b each represent a constant. Further, M represents an offset value based on the mounting error of the main lens detection unit, and N represents an offset value based on the mounting error of the subordinate lens detection unit.

The mounting error is prescribed as the amount of shift of an actual installation position from the installation position that is determined by design. Accordingly, the mounting error of the main lens detection unit is prescribed as the amount of shift of the actual installation position of the main lens detection unit from the main lens detection position that is determined by design. Further, the mounting error of the subordinate lens detection unit is prescribed as the amount of shift of the actual installation position of the subordinate lens detection unit from the subordinate lens detection position that is determined by design. The main lens detection position and the subordinate lens detection position, which are determined by design, are prescribed as positions from, for example, the distal end of the lens barrel.

The offset value is the amount of correction that is used to remove the mounting error. The offset value is set according to a direction where the mounting error occurs.

In the function $f(x)=ax+b$, "a" represent a coefficient and "b" represents an intercept. (aM−N) of the corrected function $F(x)$ is prescribed as the amount of correction, and the intercept b of the function $f(x)$ is corrected.

(3) In the lens device of (1), in a case where the subordinate lens is to be moved to a position, which is derived by a function $f(x)=ax^2+bx+c$, relative to the position x of the main lens, the subordinate lens controller corrects the function $f(x)$ to a function $F(x)=ax^2+bx+c+(2aMx+aM^2+bM-N)$ and controls the movement of the subordinate lens on the basis of the corrected function $F(x)$ (here, M represents an offset value based on the mounting error of the main lens detection unit and N represents an offset value based on the mounting error of the subordinate lens detection unit).

According to this aspect, in a case where the subordinate lens is to be moved to a position, which is derived by a function $f(x)=ax^2+bx+c$, relative to the position x of the main lens and the main lens detection unit and the subordinate lens detection unit have mounting errors, the function $f(x)$ is corrected to a function $F(x)=ax^2+bx+c+(2aMx+aM^2+bM-N)$. Here, each of a, b, and c represents a constant. Further, M represents an offset value based on the mounting error of the main lens detection unit, and N represents an offset value based on the mounting error of the subordinate lens detection unit. The mounting error is prescribed as a difference between the installation position, which is determined by design, and an actual installation position. The installation position, which is determined by design, is prescribed as a position from, for example, the distal end of the lens barrel.

In the function $f(x)=ax^2+bx+c$, "a" and "b" are coefficients and "c" is an intercept. $(2aMx+aM^2+bM-N)$ of the corrected function $F(x)$ is prescribed as the amount of correction, and the intercept c of the function $f(x)$ is corrected.

(4) In the lens device of any one of (1) to (3), a movement range of the main lens is divided into a plurality of blocks and the function $f(x)$ is set for each block.

According to this aspect, the movement range of the main lens is divided into a plurality of blocks and the function $f(x)$ is set for each block. In this case, the function $f(x)$ is corrected for each block in a case where the main lens detection unit and the subordinate lens detection unit have mounting errors.

(5) In the lens device of any one of (1) to (4), the main lens and the subordinate lens form a focusing lens.

According to this aspect, the main lens and the subordinate lens form the focusing lens. That is, the main lens and the subordinate lens are moved while interlocking with each other, so that focusing is performed (so-called floating mechanism). Accordingly, it is possible to satisfactorily correct aberration that occurs during focusing.

(6) The lens device of any one of (1) to (4) further comprising:
 a lens-side mount that is to be mounted on a camera body-side mount provided on a camera body; and
 a contact that is provided on the lens-side mount,
 wherein the target position of the main lens is input from the camera body through the contact.

According to this aspect, the lens device comprises the lens-side mount and is adapted to be attachable to and detachable from the camera body. Further, according to this aspect, an instruction to drive the lens device is given from the camera body. The camera body sets the target position of the main lens, and instructs the lens device to be driven. Accordingly, since the drive of one lens has only to be seemingly controlled from the camera body, the control of drive of the lens can be simplified.

(7) The lens device of (5) further comprising:
 a lens-side mount that is to be mounted on a camera body-side mount provided on a camera body; and
 a contact that is provided on the lens-side mount,
 wherein the target position of the focusing lens is input from the camera body through the contact and is set as the target position of the main lens.

According to this aspect, the lens device comprises the lens-side mount and is adapted to be attachable to and detachable from the camera body. Further, according to this aspect, an instruction to drive the lens device to perform focusing is given from the camera body. The camera body sets the target position of the focusing lens, and instructs the lens device to be driven. The lens device sets the target position of the focusing lens to the target position of the main lens, and controls the drive of the main lens and the subordinate lens. Accordingly, since the drive of one focusing lens has only to be seemingly controlled from the camera body, the control of focusing can be simplified.

(8) The lens device of any one of (1) to (7) further comprising:
 a correction information storage unit that stores information about an amount of correction used to correct the function f(x),
 wherein the subordinate lens controller corrects the function f(x) on the basis of the information about the amount of correction stored in the correction information storage unit, and controls the movement of the subordinate lens on the basis of the corrected function F(x).

According to this aspect, the lens device further comprises the correction information storage unit that stores information about an amount of correction used to correct the function f(x). The subordinate lens controller corrects the function f(x) on the basis of the information about the amount of correction stored in the correction information storage unit, and controls the movement of the subordinate lens on the basis of the corrected function F(x). Accordingly, it is possible to appropriately correct mounting errors that individually occur in a plurality of lens devices.

(9) A camera comprising:
 the lens device of any one of (1) to (8); and
 a camera body on which the lens device is to be attachably and detachably mounted,
 wherein the camera body includes a target position setting unit that sets a target position of the main lens, and a movement instruction unit that instructs the lens device to move the main lens to the target position set by the target position setting unit.

According to this aspect, the camera comprises the lens device of any one of (1) to (8) and a camera body on which the lens device is to be attachably and detachably mounted. All of the lens devices of (1) to (8) can move both the main lens and the subordinate lens to predetermined positions by only an instruction to move the main lens. For this reason, the camera body has only to instruct the main lens to be moved in a case where the lens device is to be driven. Accordingly, the control of drive of the lens device to be performed by the camera body can be simplified.

(10) A lens drive control method comprising:
 a step of detecting that a main lens is positioned at a main lens origin by a main lens detection unit installed at a main lens detection position;
 a step of controlling movement of the main lens on the basis of the main lens origin and moving the main lens to a target position;
 a step of detecting that a subordinate lens is positioned at a subordinate lens origin by a subordinate lens detection unit installed at a subordinate lens detection position; and
 a step of controlling movement of the subordinate lens on the basis of the subordinate lens origin and moving the subordinate lens to a position, which is derived by a function f(x), relative to a position x of the main lens, the lens drive control method further comprising:
 a step of acquiring information about mounting errors of the main lens detection unit and the subordinate lens detection unit; and
 a step of correcting the function f(x) on the basis of the acquired information about the mounting errors.

According to this aspect, in a case where the main lens detection unit and the subordinate lens detection unit have mounting errors, the function f(x) is corrected on the basis of the mounting errors and the movement of the subordinate lens is controlled on the basis of the corrected function F(x).

(11) A lens drive control program causing a computer to achieve a function to control movement of a main lens on the basis of a main lens origin detected by a main lens detection unit installed at a main lens detection position and to move the main lens to a target position and a function to control movement of a subordinate lens on the basis of a subordinate lens origin detected by a subordinate lens detection unit installed at a subordinate lens detection position and to move the subordinate lens to a position, which is derived by a function f(x), relative to a position x of the main lens, the lens drive control program comprising:
 a function to acquire information about mounting errors of the main lens detection unit and the subordinate lens detection unit; and
 a function to correct the function f(x) on the basis of the acquired information about the mounting errors.

According to this aspect, in a case where the main lens detection unit and the subordinate lens detection unit have mounting errors, the function f(x) is corrected on the basis of the mounting errors and the movement of the subordinate lens is controlled on the basis of the corrected function F(x).

According to the invention, it is possible to correctly drive a plurality of interlocking lenses.

BRIEF DESCRIPTION OF THE DRAWINGS (A) and (B) of FIG. 1 are cross-sectional views showing an embodiment of the lens configuration of a lens device.

DESCRIPTION OF THE PREFERRED EMBODIMENTS

Preferred embodiments of the invention will be described in detail below with reference to the accompanying drawings.

♦♦Lens Device♦♦

<<Lens Configuration>>

Figure 1:
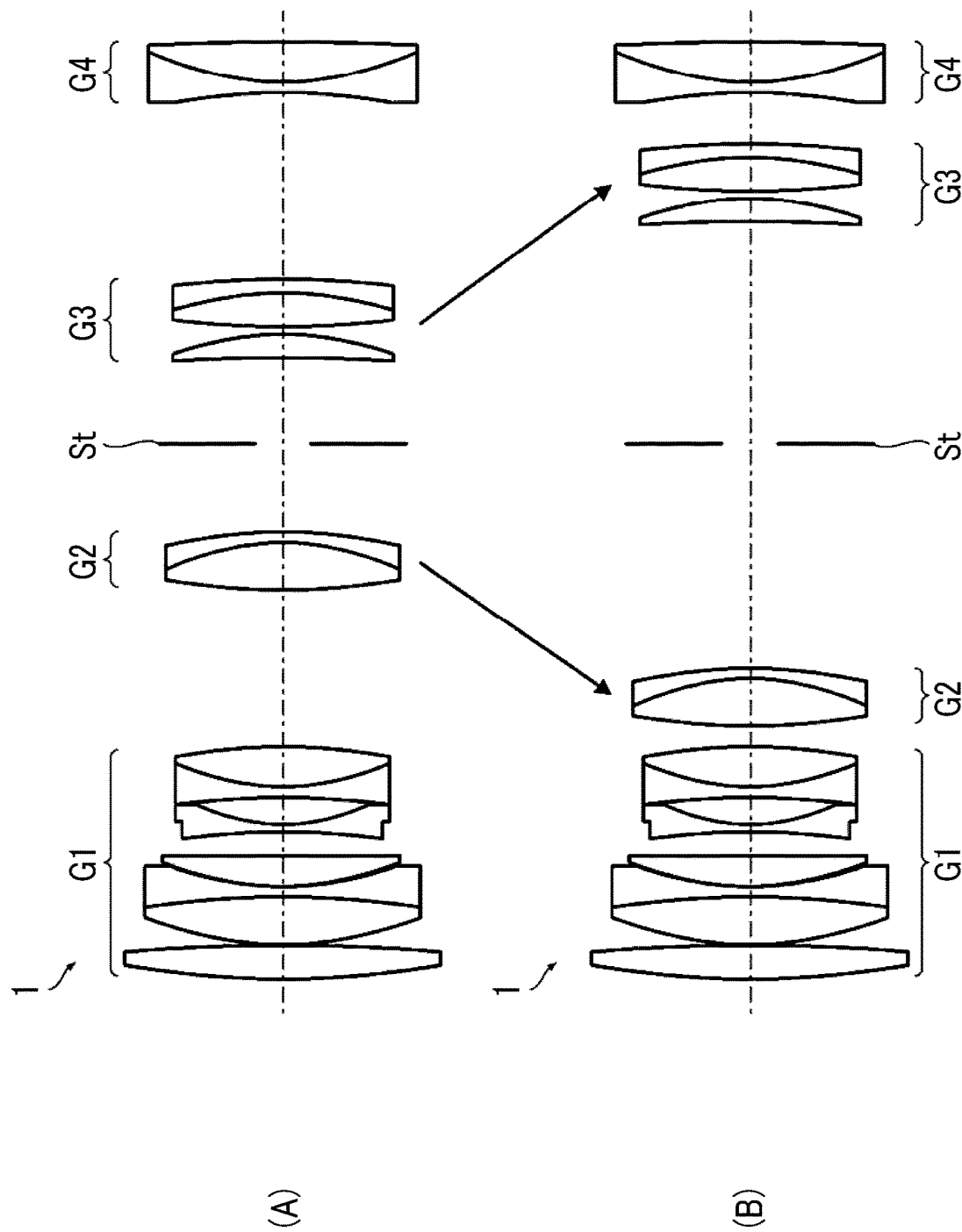

(A) and (B) of FIG. 1 are cross-sectional views showing an embodiment of the lens configuration of a lens device. (A) of FIG. 1 is a cross-sectional view showing a case where the lens device is focused on an object corresponding to the minimum object distance (M.O.D), and (B) of FIG. 1 is a cross-sectional view showing a case where the lens device is focused on an object at infinity.

A lens device 1 of this embodiment is a single-focus macro lens that can perform the imaging (macro imaging) of a near object of which the imaging magnification substantially corresponds to an actual size, and is formed of an interchangeable lens for a lens-interchangeable camera.

As shown in FIG. 1, the lens device 1 comprises a first lens group G1, a second lens group G2, an aperture stop St, a third lens group G3, and a fourth lens group G4 that are arranged in this order from an object side.

In a case where focusing to the infinity from the minimum object distance is performed, the first lens group G1 and the fourth lens group G4 are fixed, the second lens group G2 is moved to the object side, and the third lens group G3 is moved to an image side. That is, the lens device 1 of this embodiment is a lens device employing a floating mechanism that changes an interval between two lens groups to perform focusing. The third lens group G3 is moved to a position, which is derived by a function f(x), relative to a position x of the second lens group G2.

<<Drive System>>

Figure 2:
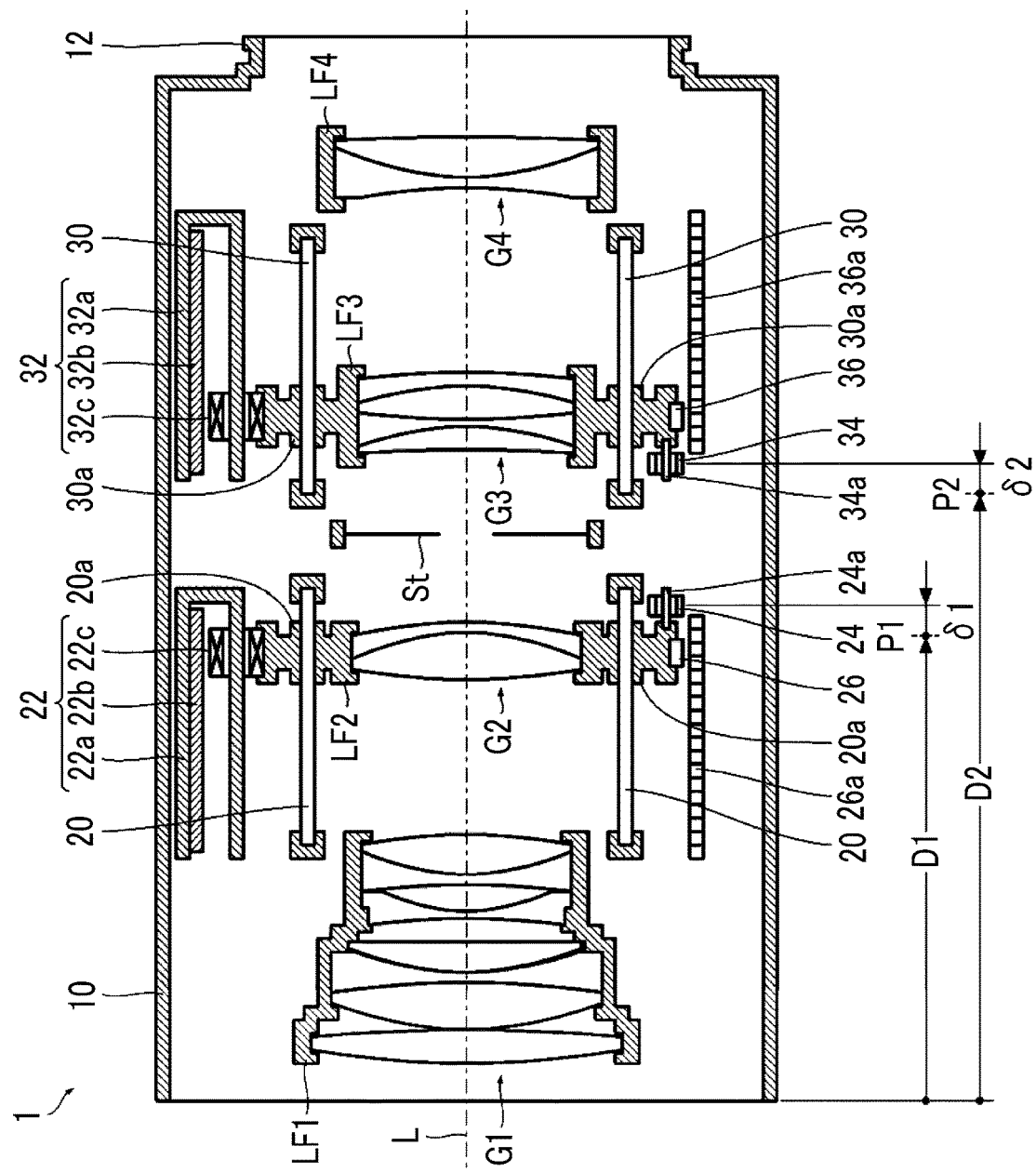
FIG. 2 is a diagram showing the schematic configuration of a drive system of the lens device.

FIG. 2 is a diagram showing the schematic configuration of a drive system of the lens device.

As shown in FIG. 2, the lens device 1 includes a lens barrel 10 that comprises a lens-side mount 12. The lens barrel 10 is attachably and detachably mounted on a camera body (not shown) through the lens-side mount 12.

The first lens group G1, the second lens group G2, the aperture stop St, the third lens group G3, and the fourth lens group G4 are arranged in the lens barrel 10 in this order from the object side. Each of the lens groups is held by a lens group-holding frame, and is disposed in the lens barrel 10. That is, the first lens group G1 is held by a first lens group-holding frame LF1 and is disposed in the lens barrel 10, and the second lens group G2 is held by a second lens group-holding frame LF2 and is disposed in the lens barrel 10. Further, the third lens group G3 is held by a third lens group-holding frame LF3 and is disposed in the lens barrel 10, and the fourth lens group G4 is held by a fourth lens group-holding frame LF4 and is disposed in the lens barrel 10.

As described above, the first lens group G1 and the fourth lens group G4 are fixed during focusing. Accordingly, the first lens group-holding frame LF1 holding the first lens group G1 and the fourth lens group-holding frame LF4 holding the fourth lens group G4 are fixed at predetermined positions in the lens barrel 10.

On the other hand, the second and third lens groups G2 and G3 form focusing lenses, and are moved during focusing. Hereinafter, the second lens group G2 will be described as a first focusing lens G2 and the third lens group G3 will be described as a second focusing lens G3. The first focusing lens G2 is one example of a main lens, and the second focusing lens G3 is one example of a subordinate lens. The first and second focusing lenses G2 and G3 are driven independently.

A plurality of first guide shafts 20 are provided in the lens barrel 10 as guide means for the first focusing lens G2. Further, a first linear motor 22 is provided in the lens barrel 10 as means for driving the first focusing lens G2. Furthermore, a first photo interrupter 24 and a first magneto resistive (MR) sensor (magnetoresistive element) 26 are provided in the lens barrel 10 as means for detecting the position of the first focusing lens G2.

Moreover, a plurality of second guide shafts 30 are provided in the lens barrel 10 as guide means for the second focusing lens G3. Further, a second linear motor 32 is provided in the lens barrel 10 as means for driving the second focusing lens G3. Furthermore, a second photo interrupter 34 and a second MR sensor 36 are provided in the lens barrel 10 as means for detecting the position of the second focusing lens G3.

<Drive System for First Focusing Lens>

[First Guide Shaft]

The plurality of first guide shafts 20 are arranged at regular intervals on the same circumference having the center on an optical axis L. The respective first guide shafts 20 are arranged in parallel to the optical axis L, and are fixed at predetermined positions in the lens barrel 10. The second lens group-holding frame LF2 holding the first focusing lens G2 is provided with a plurality of bush portions 20a into which the respective first guide shafts 20 are to be inserted. The first guide shafts 20 are inserted into the bush portions 20a, so that the first focusing lens G2 is guided to linearly move along the optical axis L.

[First Linear Motor]

The first linear motor 22 is one example of a main lens drive unit, and drives the first focusing lens G2 that is the main lens.

The first linear motor 22 moves the first focusing lens G2 back and forth along the optical axis L. The first linear motor 22 is formed of a linear voice coil motor. The first linear motor 22 comprises a yoke 22a, a magnet 22b, and a voice coil 22c. The yoke 22a is fixed at a predetermined position in the lens barrel 10. The magnet 22b is fixed to the yoke 22a. In a case where current is made to flow in the voice coil 22c provided in the magnetic field of the magnet 22b, Lorentz force is generated on the voice coil 22c. Accordingly, the voice coil 22c is moved along the optical axis L. The voice coil 22c is fixed to the second lens group-holding frame LF2 holding the first focusing lens G2. Accordingly, the first focusing lens G2 is moved along the optical axis L in a case where current is made to flow in the voice coil 22c.

[First Photo Interrupter]

The first photo interrupter 24 is one example of a main lens detection unit and detects the first focusing lens G2, which is the main lens, to detect that the first focusing lens G2 is positioned at a first focusing lens origin (main lens origin).

The first photo interrupter 24 detects a light-blocking part 24a, which is provided on the second lens group-holding frame LF2 holding the first focusing lens G2, to detect the first focusing lens G2. The first photo interrupter 24 is installed at a predetermined first focusing lens detection position (main lens detection position) P1.

The first focusing lens detection position P1 is set to a position where it is detected that the first focusing lens G2 is positioned at the first focusing lens origin. That is, the first focusing lens detection position P1 is set to a position where the light-blocking part 24a is detected in a case where the first focusing lens G2 is positioned at the first focusing lens origin. The first focusing lens origin is set to a predetermined position on the optical axis.

The first focusing lens detection position P1 is set on the basis of the distal end of the lens barrel 10. That is, the first focusing lens detection position P1 is set to a point that is away from the distal end of the lens barrel 10 by a predetermined distance D1. A mounting portion (not shown) for the first photo interrupter 24 is provided on the lens barrel 10 at the first focusing lens detection position P1. The mounting portion is provided on the lens barrel 10 as, for example, a recessed portion into which the first photo interrupter 24 can be press-fitted. The first photo interrupter 24 is mounted on the mounting portion, so that the first photo interrupter 24 is installed at the first focusing lens detection position P1.

In a case where the first photo interrupter 24 is correctly installed at the first focusing lens detection position P1, it is possible to correctly detect that the first focusing lens G2 is positioned at the first focusing lens origin by the first photo interrupter 24.

However, an error generally occurs in a case where the first photo interrupter 24 is installed. That is, the first photo interrupter 24 is installed so as to be shifted from the first focusing lens detection position P1 that is determined by design. A distance by which the first photo interrupter 24 is shifted from the first focusing lens detection position P1 determined by design is a mounting error. In a case where the mounting error occurs, the position of the first focusing lens origin is shifted from a position determined by design by the mounting error.

A state where the first photo interrupter 24 is mounted so as to be shifted from the first focusing lens detection position P1, which is determined by design, by 61 is shown in FIG. 2. Here, a shift is exaggeratingly shown for easy understanding.

Whether the mounting error of the first photo interrupter 24 is positive or negative is determined on the basis of the moving direction of the first focusing lens G2. That is, in a case where the first photo interrupter 24 is installed so as to be shifted from the first focusing lens detection position P1, which is determined by design, in a positive moving direction, the mounting error of the first photo interrupter 24 is a positive mounting error. In a case where the first photo interrupter 24 is installed so as to be shifted from the first focusing lens detection position P1 in a negative moving direction, the mounting error of the first photo interrupter 24 is a negative mounting error.

In the lens device 1 of this embodiment, the mounting error of the first photo interrupter 24 is corrected by the correction of the driving distance of the second focusing lens G3 in a case where the second focusing lens G3 is to be driven. This will be described in detail later.

[First MR Sensor]

The first MR sensor 26 detects the moving distance of the first focusing lens G2 that is based on the first focusing lens origin (=the position of the first focusing lens G2 from the first focusing lens origin).

The first MR sensor 26 is installed on the second lens group-holding frame LF2 holding the first focusing lens G2.

A magnetic scale 26a is installed on the lens barrel 10. The magnetic scale 26a is disposed along the optical axis L. The magnetic scale 26a includes a magnetic pattern where S poles and N poles are alternately arranged along the optical axis L at regular intervals.

In a case where the first focusing lens G2 is moved, the first MR sensor 26 is moved along the magnetic scale 26a. In a case where the first MR sensor 26 is moved, pulses of which the number corresponds to the moving distance of the first MR sensor 26 are output from the first MR sensor 26. Accordingly, the moving distance of the first focusing lens G2 can be detected in a case where the number of the pulses output from the first MR sensor 26 is counted.

<Drive System for Second Focusing Lens>

[Second Guide Shaft]

The plurality of second guide shafts 30 are arranged at regular intervals on the same circumference having the center on the optical axis L. The respective second guide shafts 30 are arranged in parallel to the optical axis L, and are fixed at predetermined positions in the lens barrel 10. The third lens group-holding frame LF3 holding the second focusing lens G3 is provided with a plurality of bush portions 30a into which the respective second guide shafts 30 are to be inserted. The second guide shafts 30 are inserted into the bush portions 30a, so that the second focusing lens G3 is guided to linearly move along the optical axis L.

[Second Linear Motor]

The second linear motor 32 is one example of a subordinate lens drive unit, and drives the second focusing lens G3 that is the subordinate lens.

The second linear motor 32 moves the second focusing lens G3 back and forth along the optical axis L. The second linear motor 32 is formed of a linear voice coil motor. The second linear motor 32 comprises a yoke 32a, a magnet 32b, and a voice coil 32c. The yoke 32a is fixed at a predetermined position in the lens barrel 10. The magnet 32b is fixed to the yoke 32a. In a case where current is made to flow in the voice coil 32c provided in the magnetic field of the magnet 32b, Lorentz force is generated on the voice coil 32c. Accordingly, the voice coil 32c is moved along the optical axis L. The voice coil 32c is fixed to the third lens group-holding frame LF3 holding the second focusing lens G3. Accordingly, the second focusing lens G3 is moved along the optical axis L in a case where current is made to flow in the voice coil 32c.

[Second Photo Interrupter]

The second photo interrupter 34 is one example of a subordinate lens detection unit and detects the second focusing lens G3, which is the subordinate lens, to detect that the second focusing lens G3 is positioned at a second focusing lens origin (subordinate lens origin).

The second photo interrupter 34 detects a light-blocking part 34a, which is provided on the third lens group-holding frame LF3 holding the second focusing lens G3, to detect the second focusing lens G3. The second photo interrupter 34 is installed at a predetermined second focusing lens detection position (subordinate lens detection position) P2.

The second focusing lens detection position P2 is set to a position where it is detected that the second focusing lens G3 is positioned at the second focusing lens origin. That is, the second focusing lens detection position P2 is set to a position where the light-blocking part 34a is detected in a case where the second focusing lens G3 is positioned at the second focusing lens origin. The second focusing lens origin is set to a predetermined position on the optical axis.

The second focusing lens detection position P2 is set on the basis of the distal end of the lens barrel 10. That is, the second focusing lens detection position P2 is set to a point that is away from the distal end of the lens barrel 10 by a predetermined distance D2. A mounting portion (not shown) for the second photo interrupter 34 is provided on the lens barrel 10 at the second focusing lens detection position P2. The mounting portion is provided on the lens barrel 10 as, for example, a recessed portion into which the second photo interrupter 34 can be press-fitted. The second photo interrupter 34 is mounted on the mounting portion, so that the second photo interrupter 34 is installed at the second focusing lens detection position P2.

In a case where the second photo interrupter 34 is correctly installed at the second focusing lens detection position P2, it is possible to correctly detect that the second focusing lens G3 is positioned at the second focusing lens origin by the second photo interrupter 34.

However, an error generally occurs in a case where the second photo interrupter 34 is installed. That is, the second photo interrupter 34 is installed so as to be shifted from the second focusing lens detection position P2 that is determined by design. A distance by which the second photo interrupter 34 is shifted from the second focusing lens detection position P2 determined by design is a mounting error. In a case where the mounting error occurs, the position of the second focusing lens origin is shifted from a position determined by design by the mounting error.

A state where the second photo interrupter 34 is mounted so as to be shifted from the second focusing lens detection position P2, which is determined by design, by 62 is shown in FIG. 2. Here, a shift is exaggeratingly shown for easy understanding.

Whether the mounting error of the second photo interrupter 34 is positive or negative is determined on the basis of the moving direction of the second focusing lens G3. That is, in a case where the second photo interrupter 34 is installed so as to be shifted from the second focusing lens detection position P2, which is determined by design, in a positive moving direction, the mounting error of the second photo interrupter 34 is a positive mounting error. In a case where the second photo interrupter 34 is installed so as to be shifted from the second focusing lens detection position P2 in a negative moving direction, the mounting error of the second photo interrupter 34 is a negative mounting error.

In the lens device 1 of this embodiment, the mounting error of the second photo interrupter 34 is corrected by the correction of the driving distance of the second focusing lens G3 in a case where the second focusing lens G3 is to be driven. This will be described in detail later.

[Second MR Sensor]

The second MR sensor 36 detects the moving distance of the second focusing lens G3 that is based on the second focusing lens origin (=the position of the second focusing lens G3 from the second focusing lens origin).

The second MR sensor 36 is installed on the third lens group-holding frame LF3 holding the second focusing lens G3.

A magnetic scale 36a is installed on the lens barrel 10. The magnetic scale 36a is disposed along the optical axis L. The magnetic scale 36a includes a magnetic pattern where S poles and N poles are alternately arranged along the optical axis L at regular intervals.

In a case where the second focusing lens G3 is moved, the second MR sensor 36 is moved along the magnetic scale 36a. In a case where the second MR sensor 36 is moved, pulses of which the number corresponds to the moving distance of the second MR sensor 36 are output from the second MR sensor 36. Accordingly, the moving distance of the second focusing lens G3 can be detected in a case where the number of the pulses output from the second MR sensor 36 is counted.

<Drive System for Aperture Stop>

The aperture stop St is formed of, for example, an iris stop. The aperture stop St is driven by a stop drive motor (not shown), so that stop leaf blades of the aperture stop St are driven and the diameter of an aperture is increased and reduced.

<<Control System>>

Figure 3:
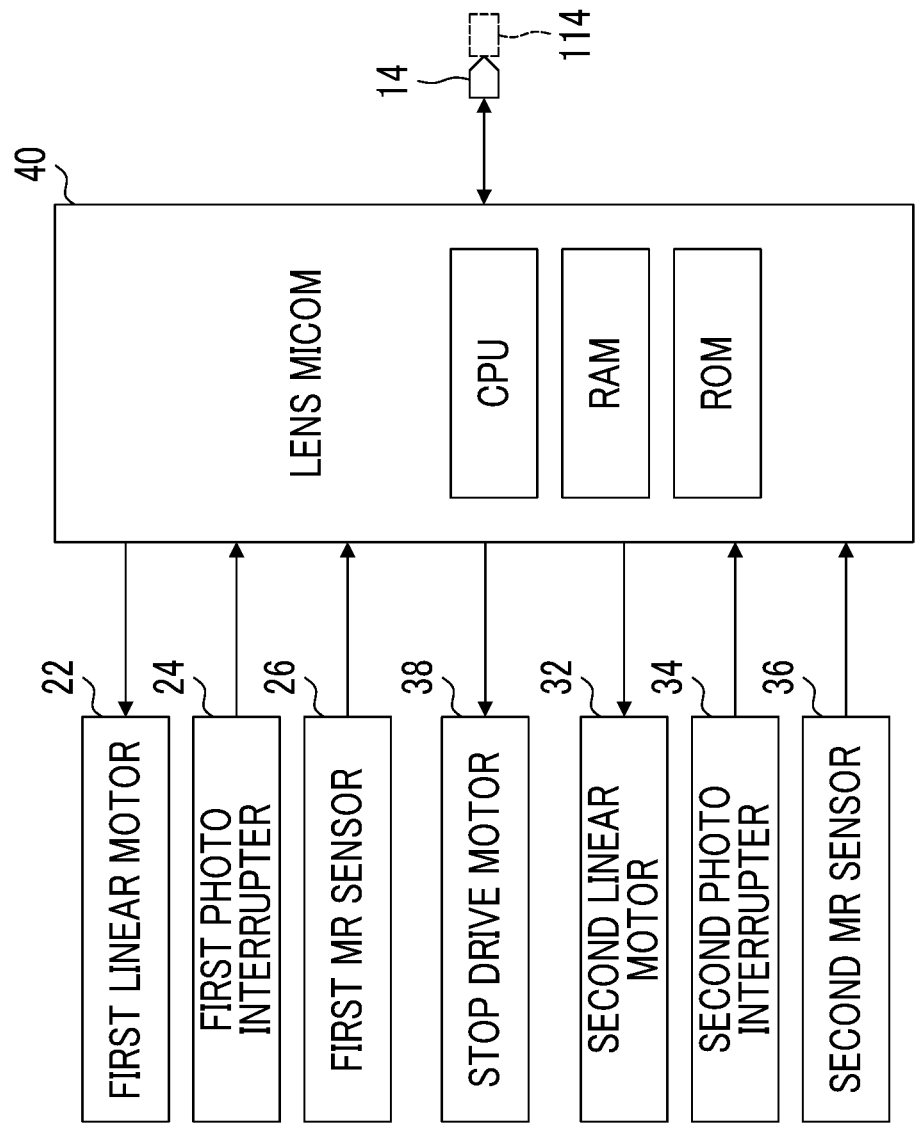
FIG. 3 is a block diagram of a control system of the lens device.

FIG. 3 is a block diagram of a control system of the lens device.

As shown in FIG. 3, the lens device 1 comprises a lens micom 40 (micom is an abbreviation for microcomputer). The lens micom 40 comprises a central processing unit (CPU), a read only memory (ROM), and a random access memory (RAM), and provides various functions through the execution of predetermined programs (lens drive control programs and the like).

The lens micom 40 is a controller that generally controls the operation of the lens device 1. The lens micom 40 controls the drive of the first linear motor 22 on the basis of the outputs of the first photo interrupter 24 and the first MR sensor 26 to control the movement of the first focusing lens G2. Further, the lens micom 40 controls the drive of the second linear motor 32 on the basis of the outputs of the second photo interrupter 34 and the second MR sensor 36 to control the movement of the second focusing lens G3. Furthermore, the lens micom 40 controls the drive of the stop drive motor 38 to control the aperture (F number) of the aperture stop St. The lens micom 40 provides a function as a controller through the execution of a predetermined control program.

Further, the lens micom 40 performs various kinds of arithmetic processing in connection with the control of the first focusing lens G2, the second focusing lens G3, and the aperture stop St. For example, the lens micom 40 performs processing for calculating the target position of the second focusing lens G3, processing for correcting the function f(x) that is used for calculation as necessary, and the like in connection with the control of the second focusing lens G3. The lens micom 40 performs various kinds of arithmetic processing through the execution of a predetermined arithmetic processing program.

Processing in cases where the lens micom 40 controls the movement of the first and second focusing lenses G2 and G3 will be individually described below.

<Control of Movement of First Focusing Lens G2>

The lens micom 40 controls the movement of the first focusing lens G2 on the basis of the first focusing lens origin detected by the first photo interrupter 24 and moves the first focusing lens G2 to a target position. The lens micom 40 is one example of a main lens controller.

Here, the target position of the first focusing lens G2 is a position to which the first focusing lens G2 is to be moved, and is set on the basis of the first focusing lens origin.

The lens micom 40 controls the drive of the first linear motor 22 on the basis of the outputs of the first photo interrupter 24 and the first MR sensor 26 and moves the first focusing lens G2 to the target position.

The target position of the first focusing lens G2 is set to the camera body (not shown) that is a part on which the lens device 1 is to be mounted. The camera body instructs the lens device 1 to be driven to set the target position of the first focusing lens G2 as the target position of a focusing lens and to move the first focusing lens G2 to the set target position. Accordingly, configuration where the drive of one focusing lens is controlled by the camera body is seemingly made.

An instruction to drive the lens device 1, which is given from the camera body, is given through contacts that are provided on the lens-side mount 12 and a camera body-side mount. In a case where the lens device 1 is mounted on the camera body, a lens-side contact 14 provided on the lens-side mount 12 is connected to a camera body-side contact 114 provided on the camera body-side mount. The lens device 1 and the camera body are connected to each other through the lens-side contact 14 and the camera body-side contact 114 so as to be capable of communicating with each other. The lens device 1 communicates with the camera body through the lens-side contact 14, and acquires information about the target position of the first focusing lens G2 from the camera body.

Only one contact is shown in FIG. 3 for convenience' sake, but a plurality of contacts are provided. The lens device 1 not only communicates with the camera body through the contact but also receives power to be supplied from the camera body through the contacts. Further, the camera body detects the mounting of the lens device through the contacts.

<Control of Movement of Second Focusing Lens G3>

The lens micom 40 controls the movement of the second focusing lens G3 on the basis of the second focusing lens origin detected by the second photo interrupter 34 and moves the second focusing lens G3 to a target position. The lens micom 40 is one example of a subordinate lens controller.

Here, the target position of the second focusing lens G3 is a position to which the second focusing lens G3 is to be moved, and is set on the basis of the second focusing lens origin. The target position of the second focusing lens G3 is set on the basis of the target position of the first focusing lens G2. Specifically, the target position of the second focusing lens G3 is set to the position, which is derived by the function f(x), relative to the position x of the first focusing lens G2.

The position x of the first focusing lens G2 is the position of the first focusing lens G2 relative to the first focusing lens origin. A distance between the first focusing lens origin and the position x is a moving distance that allows the first focusing lens G2 to be moved to the target position.

In a case where the target position of the first focusing lens G2 is set to the position x, the target position of the second focusing lens G3 is set to the position that is derived by the function f(x). In the lens device 1 of this embodiment, the function f(x) is prescribed as a linear function. That is, the function f(x) is prescribed as the function f(x)=ax+b having the coefficient a of the first order term and an intercept b.

The lens micom 40 sets the target position of the first focusing lens G2 on the basis of the target position of the focusing lens that is input from the camera body, and sets the target position of the second focusing lens G3 on the basis of the set target position of the first focusing lens G2. That is, the lens micom 40 calculates the target position of the second focusing lens G3 on the basis of the function f(x) and sets the target position of the second focusing lens G3.

Incidentally, the target position of the second focusing lens G3 is set on the basis of the second focusing lens origin as described above. Then, the second focusing lens origin is detected in a case where the second photo interrupter 34 detects the second focusing lens G3. Accordingly, the target position is set to a position shifted by a mounting error in a case where the second photo interrupter 34 has the mounting error. Like in the case of the target position of the first focusing lens G2, the target position is set to a position shifted by a mounting error in a case where the first photo interrupter 24 has the mounting error.

Accordingly, in the lens device 1 of this embodiment, the function f(x) used to derive the target position of the second focusing lens G3 is corrected to remove the influence of the mounting errors of the first and second photo interrupters 24 and 34. Processing for correcting the function f(x) is performed by the lens micom 40.

The lens micom 40 corrects the function f(x) by the amount of correction that is obtained in advance. Specifically, in a case where the function f(x), which prescribes the position of the second focusing lens G3, is prescribed as a linear function f(x)=ax+b (here, "a" is the coefficient of the first order term and "b" is an intercept), the lens micom 40 corrects the function f(x) to a function F(x)=ax+b+(aM−N). (aM−N) is the amount of correction, and the intercept b of the linear function f(x) is corrected.

Here, M is an offset value based on a mounting error $\delta 1$ of the first photo interrupter 24, and N is an offset value based on a mounting error $\delta 2$ of the second photo interrupter 34. The offset value M is prescribed as the amount of correction that is used to correct the mounting error $\delta 1$ of the first photo interrupter 24, and is set according to a direction where the mounting error occurs. The offset value N is prescribed as the amount of correction that is used to correct the mounting error $\delta 2$ of the second photo interrupter 34, and is set according to a direction where the mounting error occurs.

In a case where the lens micom 40 corrects the function f(x), the lens micom 40 calculates the target position of the second focusing lens G3 on the basis of the corrected function F(x) and sets the target position of the second focusing lens G3. Then, the lens micom 40 moves the second focusing lens G3 to the set target position of the second focusing lens G3. That is, the lens micom 40 controls the drive of the second linear motor 32 on the basis of the outputs of the second photo interrupter 34 and the second MR sensor 36, and moves the second focusing lens G3 to the target position.

The mounting error $\delta 1$ of the first photo interrupter 24 and the mounting error $\delta 2$ of the second photo interrupter 34 are measured and acquired in a step of assembling the lens device 1. Then, the lens micom 40 sets the offset values M and N on the basis of the mounting errors $\delta 1$ and $\delta 2$ and calculates the amount (aM−N) of correction. The calculated amount (aM−N) of correction is stored in the ROM of the lens micom 40 as information about the amount of correction that is used to correct the function f(x). The ROM of the lens micom 40 is one example of a correction information storage unit.

The lens micom 40 acquires information about the amount (aM−N) of correction from the ROM, and corrects the function f(x) on the acquired information.

[Detail of Calculation of Amount (aM−N) of Correction]

In a case where the function f(x), which prescribes the position of the second focusing lens G3, is prescribed as a linear function f(x)=ax+b as described above, the function f(x) is corrected to a function F(x)=ax+b+(aM−N) but the amount (aM−N) of correction of the function f(x) is calculated as follows.

First, a case where the first and second focusing lenses G2 and G3 are controlled independently will be considered. That is, a case where the target positions of the first and second focusing lenses G2 and G3 are set independently and both the first and second focusing lenses G2 and G3 are controlled independently will be considered. In this case, a command for the first focusing lens G2 and a command for the second focusing lens G3 are output independently.

Here, the target position of the first focusing lens G2 is denoted by p and the target position of the second focusing lens G3 is denoted by q.

With regard to the first focusing lens G2, in a case where the first photo interrupter 24 does not have a mounting error, the position p is set as the target position of the first focusing lens G2 just as it is.

On the other hand, in a case where the first photo interrupter 24 has a mounting error, the target position p of the first focusing lens G2 is corrected to remove the influence of the mounting error. In a case where an offset value based on the mounting error δ1 of the first photo interrupter 24 is denoted by M and the corrected target position is denoted by P, the corrected target position P is represented by "P=p+M . . . (Equation 1)". That is, the offset value is added or subtracted to correct the target position p. In a case where the first focusing lens G2 is moved to the corrected target position P, the first focusing lens G2 can be correctly moved to the determined target position.

With regard to the second focusing lens G3, in a case where the second photo interrupter 34 does not have a mounting error, the position q is set as the target position of the second focusing lens G3 just as it is.

On the other hand, in a case where the second photo interrupter 34 has a mounting error, the target position q of the second focusing lens G3 is corrected to remove the influence of the mounting error. In a case where an offset value based on the mounting error δ2 of the second photo interrupter 34 is denoted by N and the corrected target position is denoted by Q, the corrected target position Q is represented by "Q=q+N . . . (Equation 2)". That is, the offset value is added or subtracted to correct the target position q. In a case where the second focusing lens G3 is moved to the corrected target position Q, the second focusing lens G3 can be correctly moved to the determined target position.

Next, a case where the target position q of the second focusing lens G3 is set on the basis of the target position p of the first focusing lens G2 will be considered.

In a case where the second focusing lens G3 is to be moved to a position, which is derived by "f(x)=ax+b" . . . (Equation 3), relative to the position x of the first focusing lens G2, a relationship of "q=ap+b . . . (Equation 4)" is satisfied between the target position p of the first focusing lens G2 and the target position q of the second focusing lens G3.

In a case where the first and second photo interrupters 24 and 34 have mounting errors, the target positions p and q are corrected to "P=p+M . . . (Equation 1)" and "Q=q+N . . . (Equation 2)" from Equation 1 and Equation 2, respectively.

A relationship of "Q=aP+b . . . (Equation 5)" is satisfied between the corrected target positions P and Q from Equation 3.

In a case where Equation 1 and Equation 2 are put into Equation 5 and Equation 5 is solved with respect to q, Equation 6 is derived as follows.

$$Q=aP+b \quad \text{(Equation 5)}$$

$$q+N=a(p+M)+b$$

$$q=ap+aM+b-N$$

$$q=ap+b+(aM-N) \quad \text{(Equation 6)}$$

As evident from Equation 4 and Equation 6, (aM−N) is the amount of correction used to remove mounting errors in a case where the first and second photo interrupters 24 and 34 have mounting errors.

In a case the function f(x) is corrected by the amount (aM−N) of correction, the second focusing lens G3 can be moved to a prescribed positioned relative to the first focusing lens G2 even though the first and second photo interrupters 24 and 34 have mounting errors.

<<Action>>

Next, the action (lens drive control method) of the lens device 1 of this embodiment having the above-mentioned configuration will be described.

Figure 4:
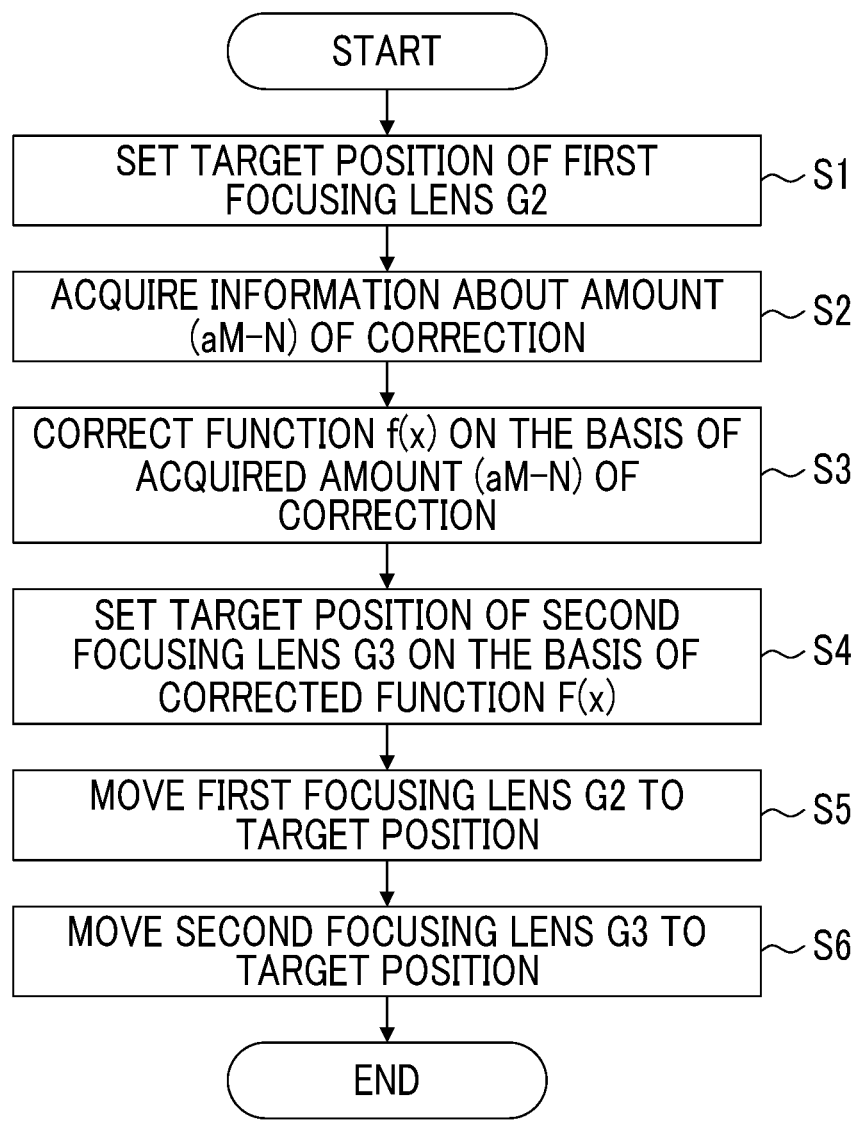
FIG. 4 is a flowchart showing the procedure for controlling the drive of the lens device during focusing.

FIG. 4 is a flowchart showing the procedure for controlling the drive of the lens device during focusing.

First, the target position of the first focusing lens G2 is set (Step S1). The camera body sets the target position of the first focusing lens G2, makes information about the set target position be included in a drive command, and outputs the drive command to the lens micom 40. The drive command, which is output from the camera body, is input to the lens micom 40 through the lens-side contact 14. The lens micom 40 sets the target position of the first focusing lens G2 on the basis of the input drive command.

Then, information about the amount (aM−N) of correction of the function f(x) is acquired (Step S2). The lens micom 40 reads and acquires the information about the amount (aM−N) of correction from the ROM.

After that, the function f(x) is corrected on the basis of the acquired amount (aM−N) of correction (Step S3). The lens micom 40 corrects the function f(x)=ax+b to the F(x)=ax+b+(aM−N) on the basis of the acquired amount (aM−N) of correction.

Then, the target position of the second focusing lens G3 is set on the basis of the corrected function F(x) (Step S4). The lens micom 40 calculates the target position of the second focusing lens G3 on the basis of the corrected function F(x)=ax+b+(aM−N) and sets the target position of the second focusing lens G3. In this case, the target position of the second focusing lens G3 is set to a position of "aX+b+(aM−N)", for example, in a case where the target position of the first focusing lens G2 is set to a position X.

After that, the movement of the first focusing lens G2 is controlled so that the first focusing lens G2 is moved to the set target position of the first focusing lens G2 (Step S5). The lens micom 40 controls the drive of the first linear motor 22 on the basis of the outputs of the first photo interrupter 24 and the first MR sensor 26, and controls the movement of the first focusing lens G2 so that the first focusing lens G2 is moved to the set target position of the first focusing lens G2.

Then, the movement of the second focusing lens G3 is controlled so that the second focusing lens G3 is moved to the set target position of the second focusing lens G3 (Step S6). The lens micom 40 controls the drive of the second linear motor 32 on the basis of the outputs of the second photo interrupter 34 and the second MR sensor 36, and controls the movement of the second focusing lens G3 so that the second focusing lens G3 is moved to the set target position of the second focusing lens G3.

Even in a case where the first and second photo interrupters 24 and 34 for detecting the first and second focusing lens origins have mounting errors, it is possible to control the positions of the first and second focusing lenses G2 and G3 with high accuracy by removing the influence of the mounting errors in the lens device 1 of this embodiment as described above.

Since a command, which is output from the camera body in a case where focusing is performed, is only a command for the target position of the second focusing lens G3, the control thereof can also be easily performed.

Further, since only the position of the second focusing lens G3 is corrected in a case where the influence of the mounting error is to be removed, the extra movement stroke of the first focusing lens G2 does not need to be considered. Accordingly, the size of the lens device can be reduced in the moving direction of the first focusing lens G2.

Furthermore, since only the position of the second focusing lens G3 is corrected, the number of parameters required for control can also be reduced.

♦♦Modification Example of Lens Device♦♦

<<Modification Example of Function f(x)>>

A case where the positional relationship between the first and second focusing lenses G2 and G3 is prescribed by the linear function $f(x)=ax+b$ has been described in the embodiment by way of example, but the function $f(x)$ prescribing the positional relationship between the first and second focusing lenses G2 and G3 is not limited thereto. The invention can also be applied to a case where the positional relationship between the first and second focusing lenses G2 and G3 is prescribed by a higher-order function.

For example, the invention can also be applied to a case where the positional relationship between the first and second focusing lenses G2 and G3 is prescribed by a quadratic function $f(x)=ax^2+bx+c$. That is, the invention can also be applied to a case where the second focusing lens G3 as the subordinate lens is to be moved to a position, which is derived by the function $f(x)=ax^2+bx+c$, relative to the position x of the first focusing lens G2 as the main lens. In this case, the amount of correction used to correct the function $f(x)$ is prescribed by $(2aMx+aM^2+bM-N)$. That is, the corrected function F(x) is "$F(x)=ax^2+bx+c+(2aMx+aM^2+bM-N)$".

Further, a plurality of functions may be combined to prescribe a function that prescribes the positional relationship between the first and second focusing lenses G2 and G3. In this case, the movement range of the first focusing lens G2, which is the main lens, is divided into a plurality of blocks, and a function fn(x) is set for each block.

Figure 5:
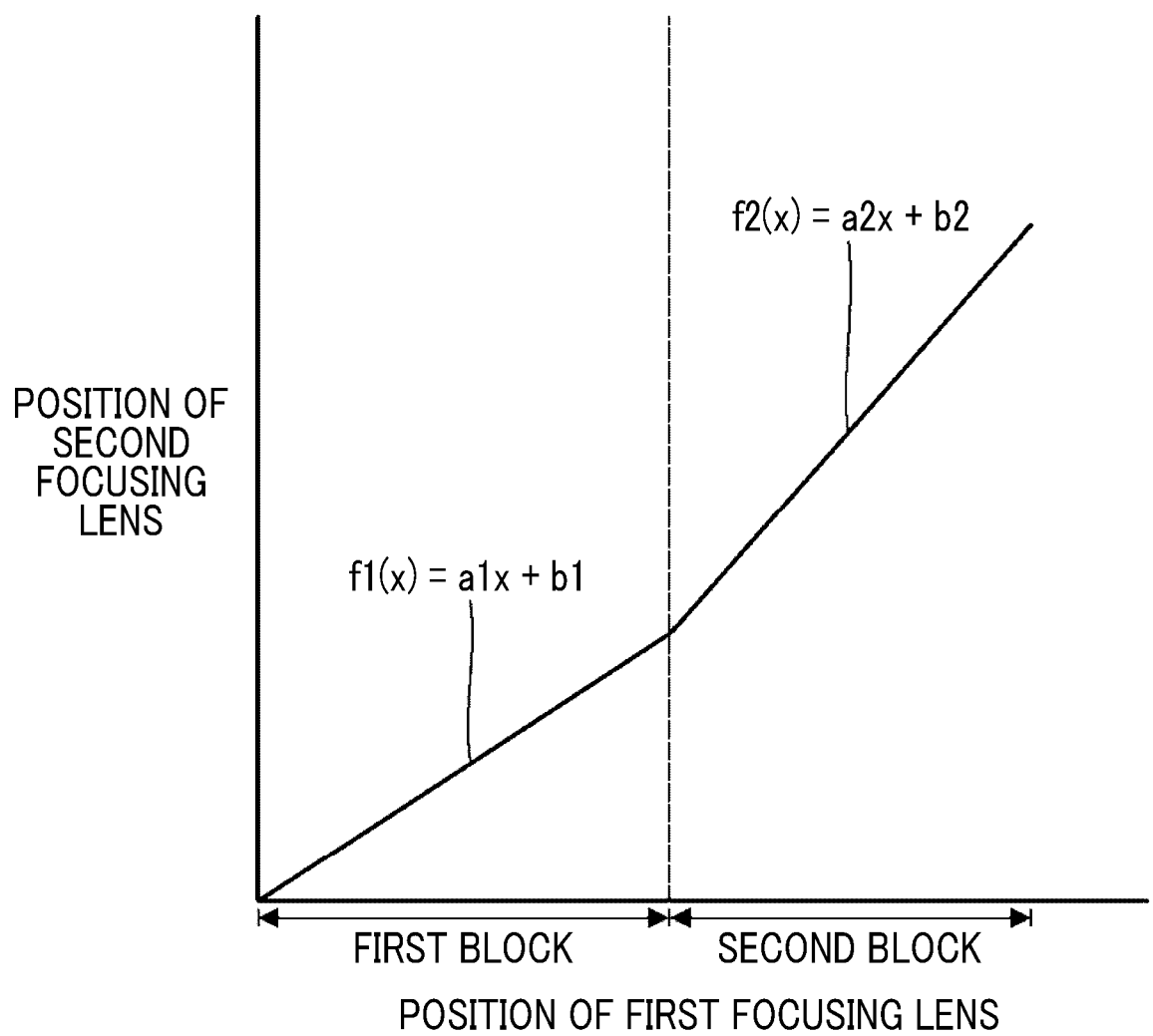
FIG. 5 is a graph showing a positional relationship between a first focusing lens and a second focusing lens in a case where a plurality of functions are combined to prescribe the positional relationship between the first focusing lens and the second focusing lens.

FIG. 5 is a graph showing the positional relationship between the first and second focusing lenses in a case where a plurality of functions are combined to prescribe the positional relationship between the first and second focusing lenses. In FIG. 5, a horizontal axis represents the position of the first focusing lens G2 and a vertical axis represents the position of the second focusing lens G3.

FIG. 5 shows an example of a case where two functions f1(x) and f2(x) are combined to prescribe the positional relationship between the first and second focusing lenses G2 and G3. The movement range of the first focusing lens G2 is divided into two blocks, and a function determining the position of the second focusing lens G3 is prescribed for each block. In a case where the first focusing lens G2 is positioned at a first block, the position of the second focusing lens G3 is prescribed by a first function $f1(x)=a1x+b1$ (a1 is the coefficient of the first order term and b1 is an intercept). On the other hand, in a case where the first focusing lens G2 is positioned at a second block, the position of the second focusing lens G3 is prescribed by a second function $f2(x)=a2x+b2$ (a2 is the coefficient of the first order term and b2 is an intercept).

In a case where the first and second photo interrupters 24 and 34 have mounting errors, each of the functions is corrected. Specifically, the first function $f1(x)=a1x+b1$ is corrected to a $F1(x)=a1 x+b1+(a1M-N)$. Further, the second function $f2(x)=a2x+b2$ is corrected to a $F2(x)=a2x+b2+(a2M-N)$.

<<Method of Correcting Function f(x)>>

In the embodiment, information about the amount (aM−N) of correction of the function f(x) is stored in the ROM of the lens micom 40 and is read to correct the function f(x). However, a method of correcting the function f(x) is not limited thereto.

For example, information about the offset values M and N may be stored in the ROM of the lens micom 40. In this case, the lens micom 40 reads the information about the offset values M and N from the ROM to set the amount (aM−N) of correction, and corrects the function f(x) with the set amount (aM−N) of correction.

Alternatively, for example, information about the mounting errors δ1 and δ2 may be stored in the ROM of the lens micom 40. In this case, the lens micom 40 reads the information about the mounting errors δ1 and δ2 from the ROM to set the offset values M and N. Then, the lens micom 40 sets the amount (aM−N) of correction from the set offset values M and N, and corrects the function f(x) with the set amount (aM−N) of correction.

<<Case where there are Plurality of Subordinate Lenses>>

A case where the movement of one subordinate lens is controlled with respect to one main lens has been described in the embodiment by way of example. However, the invention can also be applied to a case where the movement of a plurality of subordinate lenses is controlled with respect to one main lens. In this case, the movement of each subordinate lens is controlled using a relationship between one main lens and each subordinate lens.

<<Application to Lenses Other than Focusing Lens>>

A case where the invention is applied to the drive of a plurality of lenses forming a focusing lens has been described in the embodiment by way of example, but the application of the invention is not limited thereto. The invention can be applied to the drive of a plurality of interlocking lenses. For example, in a zoom lens including a variable magnification lens and a correction lens, the correction lens is moved while interlocking with the movement of the variable magnification lens. Accordingly, in a case where the variable magnification lens and the correction lens are to be individually driven, the invention can be applied to control the drive of the variable magnification lens and the correction lens.

<<Control of Drive in Open-Loop Control>>

In the embodiment, the positions of the first and second focusing lenses G2 and G3 are detected by the first and second MR sensors 26 and 36 and the movement of the first and second focusing lenses G2 and G3 is controlled by so-called feedback control. However, the movement of the first and second focusing lenses G2 and G3 can also be controlled by so-called open-loop control. In this case, the first and second MR sensors 26 and 36 are not necessary.

<<Main Lens and Subordinate Lens>>

In the embodiment, the drive of the first and second focusing lenses G2 and G3 is controlled while the first focusing lens G2 is used as the main lens and the second focusing lens G3 is used as the subordinate lens. However, the drive of the first and second focusing lenses G2 and G3 can also be controlled while the second focusing lens G3 is used as the main lens and the first focusing lens G2 is used as the subordinate lens.

It is preferable that the main lens is selected on the basis of the following reference. That is, (1) a lens of which the moving distance is shortest is used as the main lens, and (2) a lens of which a change in image magnification with respect to unit displacement is smallest is used as the main lens in the case of a lens forming a focusing lens.

(1) A case where a lens of which the moving distance is shortest is used as the main lens For example, in the case of a lens forming a focusing lens, a lens of which the moving distance required for focusing up to the minimum object distance from the infinity is shortest is selected as the main lens.

In a case where the camera body and the lens device communicate with each other and the lens device is driven on the basis of a command output from the camera body, a position detection resolution and a stroke (moving distance) need to be set within the limit of the bit length of a communication command. For example, the number of positions where the focusing lens can be stopped is determined according to the bit length of a command that designates the position of the focusing lens. Accordingly, the movable range of a lens, which is more desirable in a case where a resolution is lower, can be set to be wide, but the movable range of a lens requiring a high resolution is narrow.

Since a lens of which the moving distance is shortest is used as the main lens, a lens of which the moving distance is long can be driven without being limited by a communication command. Accordingly, the position of the lens of which the moving distance is long can be adjusted with high accuracy.

(2) A case where a lens of which a change in image magnification with respect to unit displacement is smallest is used as the main lens in the case of a lens forming a focusing lens In a case where the camera body and the lens device communicate with each other and the lens device is driven on the basis of a command output from the camera body as described above, the position of the subordinate lens can be controlled with high accuracy without being limited by a communication command. Accordingly, since a lens of which a change in image magnification with respect to unit displacement is large is used as the subordinate lens, the occurrence of focus breathing caused by the deterioration of driving accuracy can be effectively suppressed. The focus breathing is a phenomenon where the angle of view is changed with focusing.

A change in image magnification with respect to unit displacement is a change in image magnification on an image plane with respect to displacement per unit moving distance. Since an image magnification on an image plane is changed, the angle of view is changed.

<<Lens Device Integrally Built in Camera>>

A case where the invention is applied to the interchangeable lens for a lens-interchangeable camera has been described in the embodiment by way of example, but the application of the invention is not limited thereto. The invention can also be applied to a lens device that is integrally built in a camera body likewise.

♦♦Camera♦♦

Figure 6:
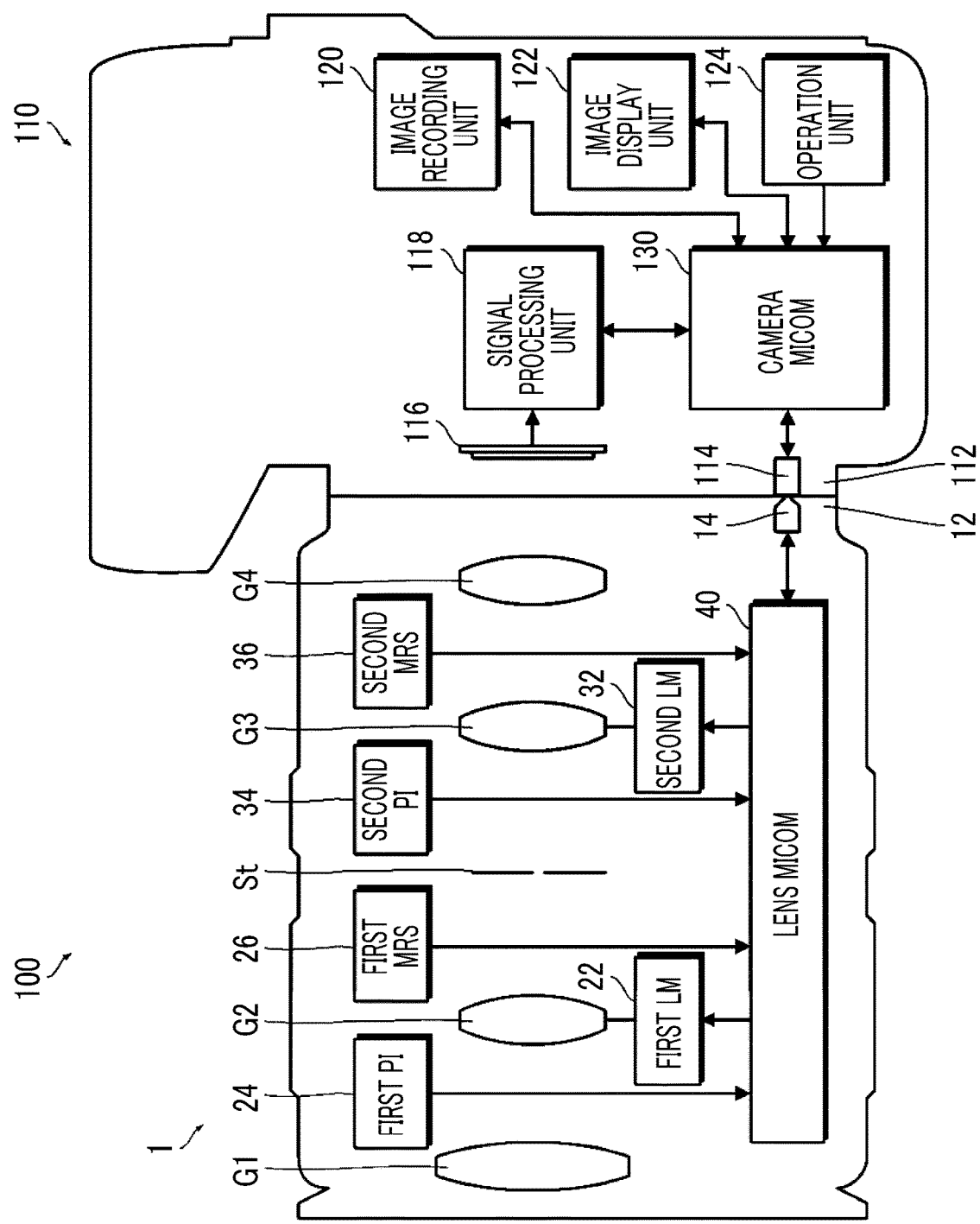
FIG. 6 is a diagram showing the schematic configuration of one example of a lens-interchangeable camera to which the invention is applied.

FIG. 6 is a diagram showing the schematic configuration of one example of a lens-interchangeable camera to which the invention is applied.

A lens-interchangeable camera 100 comprises a lens device 1 and a camera body 110 on which the lens device 1 is to be attachably and detachably mounted.

The configuration of the lens device 1 is the same as the configuration of the lens device 1 of the embodiment. Accordingly, the description thereof will be omitted.

The camera body 110 comprises a camera-side mount 112, and the lens device 1 is attachably and detachably mounted on the camera-side mount 112. The camera-side mount 112 is provided with a camera body-side contact 114, and the camera body-side contact 114 is connected to the lens-side contact 14 of the lens device 1 in a case where the lens device 1 is mounted on the camera-side mount 112.

The camera body 110 is a camera body of a digital camera. The camera body 110 mainly comprises an image sensor 116, a signal processing unit 118, an image recording unit 120, an image display unit 122, an operation unit 124, and a camera micom 130.

The image sensor 116 is formed of, for example, a solid-state imaging element, such as a charged coupled device (CCD) or a complementary metal oxide semiconductor (CMOS).

The signal processing unit 118 is a unit for processing a signal that is output from the image sensor 116. The signal processing unit 118 processes the signal, which is output from the image sensor 116, to generate image data.

The image recording unit 120 is a unit for recording the image data obtained from imaging. The image recording unit 120 records image data in, for example, a medium, such as a memory card.

The image display unit 122 is a unit for displaying an image. The image display unit 122 is used to display a live view, a taken image, a menu screen, and the like.

The operation unit 124 is an operation unit for the camera body 110, and includes various operation buttons, such as a power button and a release button.

The camera micom 130 is a controller that generally controls the operation of the camera body 110. The camera micom 130 comprises a CPU, a ROM, and a RAM, and provides various functions through the execution of predetermined programs.

As described above, the target position of the first focusing lens G2 of the lens device 1 is set by the camera body 110. The camera micom 130 functions as a target position setting unit that sets the target position of the first focusing lens G2. Further, the camera micom 130 functions as a movement instruction unit that instructs the lens device 1 to move the first focusing lens G2. The camera micom 130 provides these functions through the execution of predetermined control programs.

Here, the camera micom 130 detects a focus position on the basis of a signal output from the image sensor 116, and sets the target position of the first focusing lens G2. For example, the camera micom 130 performs auto focus (AF) processing using a contrast method to detect a focus position, and sets the target position of the first focusing lens G2.

Further, the camera micom 130 communicates with the lens micom 40 through the camera body-side contact 114, and outputs a drive command to the lens micom 40.

A case where the camera body 110 is formed of a camera body of a digital camera has been described in this example by way of example, but the camera body can also be formed of a camera body of a so-called film camera. Further, the digital camera includes a broadcast camera, a cinema camera, and the like.

Further, a method of detecting a focus position on the basis of a signal output from the image sensor 116 is employed in this example, but a method of detecting a focus position by an AF sensor can also be employed.

◆◆Other Embodiments◆◆

The main lens controller for controlling the movement of the main lens and the subordinate lens controller for controlling the movement of the subordinate lens are formed of the micom (lens micom) in the embodiment, but hardware configuration for achieving the main lens controller and the subordinate lens controller is not limited thereto. The main lens controller and the subordinate lens controller can be formed of various processors. Various processors include: a CPU that is a general-purpose processor functioning as a processing unit for performing various kinds of processing through the execution of software (program); a programmable logic device (PLD), such as a field programmable gate array (FPGA), which is a processor of which the circuit configuration can be changed after manufacture; a dedicated electrical circuit, such as an application specific integrated circuit (ASIC), which is a processor having circuit configuration designed for exclusive use to perform specific processing; and the like.

One processing unit may be formed of one of these various processors, or may be formed of two or more processors of the same type or different types. For example, one processing unit may be formed of a plurality of FPGAs or may be formed of a combination of a CPU and an FPGA.

Further, a plurality of processing units may be formed of one processor. As an example in which a plurality of processing units are formed of one processor, first, there is an aspect in which one processor is formed of a combination of software and one or more CPUs so as to be typified by a computer, such as a client or a server, and functions as a plurality of processing units. Second, there is an aspect in which a processor, which realizes the function of the entire system including a plurality of processing units by one integrated circuit (IC) chip, is used so as to be typified by System On Chip (SoC) or the like. As described above, the various processing units are formed using one or more of the above-mentioned various processors as hardware structures.

Furthermore, the hardware structures of these various processors are more specifically electrical circuits where circuit elements, such as semiconductor elements, are combined.

EXPLANATION OF REFERENCES

1: lens device
10: lens barrel
12: lens-side mount
14: lens-side contact
20: first guide shaft
20a: bush portion
22: first linear motor
22a: yoke
22b: magnet
22c: voice coil
24: first photo interrupter
24a: light-blocking part
26: first MR sensor
26a: magnetic scale
30: second guide shaft
30a: bush portion
32: second linear motor
32a: yoke
32b: magnet
32c: voice coil
34: second photo interrupter
34a: light-blocking part
36: second MR sensor
36a: magnetic scale
38: stop drive motor
40: lens micom
100: lens-interchangeable camera
110: camera body
112: camera-side mount
114: camera body-side contact
116: image sensor
118: signal processing unit
120: image recording unit
122: image display unit
124: operation unit
130: camera micom
G1: first lens group
G2: first focusing lens (second lens group)
G3: second focusing lens (third lens group)
G4: fourth lens group
St: aperture stop
L: optical axis
LF1: first lens group-holding frame
LF2: second lens group-holding frame
LF3: third lens group-holding frame
LF4: fourth lens group-holding frame
P1: first focusing lens detection position
P2: second focusing lens detection position
δ1: mounting error of first photo interrupter
δ2: mounting error of second photo interrupter
S1 to S6: procedure for controlling drive of lens device during focusing

What is claimed is:

1. A lens device comprising:
a main lens;
a main lens drive unit that drives the main lens;
a main lens detection unit installed at a main lens detection position and detecting the main lens to detect that the main lens is positioned at a main lens origin;
a main lens controller that controls movement of the main lens on the basis of the main lens origin and moves the main lens to a target position;
a subordinate lens;
a subordinate lens drive unit that drives the subordinate lens;
a subordinate lens detection unit installed at a subordinate lens detection position and detecting the subordinate lens to detect that the subordinate lens is positioned at a subordinate lens origin; and
a subordinate lens controller that controls movement of the subordinate lens on the basis of the subordinate lens origin and moves the subordinate lens to a position, which is derived by a function f(x), relative to a position x of the main lens,
wherein in a case where the main lens detection unit and the subordinate lens detection unit have mounting errors, the subordinate lens controller corrects the function f(x) on the basis of the mounting errors and controls the movement of the subordinate lens on the basis of a corrected function F(x).

2. The lens device according to claim 1,
wherein in a case where the subordinate lens is to be moved to a position, which is derived by a function f(x)=ax+b (here, a and b each represent a constant), relative to the position x of the main lens, the subordinate lens controller corrects the function f(x) to a function F(x)=ax+b+(aM−N) and controls the movement of the subordinate lens on the basis of the corrected function F(x) (here, M represents an offset value based on the mounting error of the main lens detection unit and N represents an offset value based on the mounting error of the subordinate lens detection unit).

3. The lens device according to claim 1,
wherein in a case where the subordinate lens is to be moved to a position, which is derived by a function f(x)=ax$^2$+bx+c (here, a, b, and c each represent a constant), relative to the position x of the main lens, the subordinate lens controller corrects the function f(x) to a function F(x)=ax$^2$+bx+c+(2aMx+aM$^2$+bM−N) and controls the movement of the subordinate lens on the basis of the corrected function F(x) (here, M represents an offset value based on the mounting error of the main lens detection unit and N represents an offset value based on the mounting error of the subordinate lens detection unit).

4. The lens device according to claim 1,
wherein a movement range of the main lens is divided into a plurality of blocks and the function f(x) is set for each block.

5. The lens device according to claim 2,
wherein a movement range of the main lens is divided into a plurality of blocks and the function f(x) is set for each block.

6. The lens device according to claim 3,
wherein a movement range of the main lens is divided into a plurality of blocks and the function f(x) is set for each block.

7. The lens device according to claim 1,
wherein the main lens and the subordinate lens form a focusing lens.

8. The lens device according to claim 2,
wherein the main lens and the subordinate lens form a focusing lens.

9. The lens device according to claim 3,
wherein the main lens and the subordinate lens form a focusing lens.

10. The lens device according to claim 4,
wherein the main lens and the subordinate lens form a focusing lens.

11. The lens device according to claim 1, further comprising:
a lens-side mount that is to be mounted on a camera body-side mount provided on a camera body; and
a contact that is provided on the lens-side mount,
wherein the target position of the main lens is input from the camera body through the contact.

12. The lens device according to claim 2, further comprising:
a lens-side mount that is to be mounted on a camera body-side mount provided on a camera body; and
a contact that is provided on the lens-side mount,
wherein the target position of the main lens is input from the camera body through the contact.

13. The lens device according to claim 3, further comprising:
a lens-side mount that is to be mounted on a camera body-side mount provided on a camera body; and
a contact that is provided on the lens-side mount,
wherein the target position of the main lens is input from the camera body through the contact.

14. The lens device according to claim 4, further comprising:
a lens-side mount that is to be mounted on a camera body-side mount provided on a camera body; and
a contact that is provided on the lens-side mount,
wherein the target position of the main lens is input from the camera body through the contact.

15. The lens device according to claim 7, further comprising:
a lens-side mount that is to be mounted on a camera body-side mount provided on a camera body; and
a contact that is provided on the lens-side mount,
wherein a target position of the focusing lens is input from the camera body through the contact and is set as the target position of the main lens.

16. The lens device according to claim 1, further comprising:
a correction information storage unit that stores information about an amount of correction used to correct the function f(x),
wherein the subordinate lens controller corrects the function f(x) on the basis of the information about the amount of correction stored in the correction information storage unit, and controls the movement of the subordinate lens on the basis of the corrected function F(x).

17. A camera comprising:
the lens device according to claim 1; and
a camera body on which the lens device is to be attachably and detachably mounted,
wherein the camera body includes a target position setting unit that sets a target position of the main lens, and a movement instruction unit that instructs the lens device to move the main lens to the target position set by the target position setting unit.

18. A lens drive control method comprising:
a step of detecting that a main lens is positioned at a main lens origin by a main lens detection unit installed at a main lens detection position;
a step of controlling movement of the main lens on the basis of the main lens origin and moving the main lens to a target position;
a step of detecting that a subordinate lens is positioned at a subordinate lens origin by a subordinate lens detection unit installed at a subordinate lens detection position; and
a step of controlling movement of the subordinate lens on the basis of the subordinate lens origin and moving the subordinate lens to a position, which is derived by a function f(x), relative to a position x of the main lens,
the lens drive control method further comprising:
a step of acquiring information about mounting errors of the main lens detection unit and the subordinate lens detection unit; and
a step of correcting the function f(x) on the basis of the acquired information about the mounting errors.

19. A non-transitory computer readable recording medium storing a lens drive control program causing a computer to achieve a function to control movement of a main lens on the basis of a main lens origin detected by a main lens detection unit installed at a main lens detection position and to move the main lens to a target position and a function to control movement of a subordinate lens on the basis of a subordinate lens origin detected by a subordinate lens detection unit installed at a subordinate lens detection position and to move the subordinate lens to a position, which is derived by a function $f(x)$, relative to a position x of the main lens, the lens drive control program comprising:
- a function to acquire information about mounting errors of the main lens detection unit and the subordinate lens detection unit; and
- a function to correct the function $f(x)$ on the basis of the acquired information about the mounting errors.

* * * * *